United States Patent [19]

Scharf

[11] 4,406,474
[45] Sep. 27, 1983

[54] VEHICLE FENDER ATTACHMENT AND SUPPORT STRUCTURE

[75] Inventor: Heino W. Scharf, Knoxville, Tenn.

[73] Assignee: Dempster Systems Inc., Knoxville, Tenn.

[21] Appl. No.: 264,339

[22] Filed: May 18, 1981

[51] Int. Cl.³ ............................................ B62D 25/16
[52] U.S. Cl. .............................. 280/154; 280/154.5 R; 411/538
[58] Field of Search .................... 280/154.5 R, 152 B, 280/153 R, 154; 248/181, 188.1, 288.3, 288.5, 663; 403/408; 411/537–538

[56] References Cited

U.S. PATENT DOCUMENTS

| | | | |
|---|---|---|---|
| 1,380,347 | 6/1921 | Blume | 248/188.1 |
| 2,679,403 | 5/1954 | Howard et al. | 280/154.5 R |
| 3,220,289 | 11/1965 | Farekas | 411/537 |
| 3,506,282 | 4/1970 | Miyanaga | 280/152 |
| 3,876,229 | 4/1975 | Kohn et al. | 280/152 |
| 4,268,053 | 5/1981 | Toppins | 280/154 |

FOREIGN PATENT DOCUMENTS 327459  4/1930  United Kingdom ............ 280/152 R

Primary Examiner—David M. Mitchell
Assistant Examiner—Timothy Roesch
Attorney, Agent, or Firm—Jacox & Meckstroth

[57] ABSTRACT

Structure for attachment and support of a fender of a vehicle such as a truck or the like in which the vehicle is subject to travel over rough or uneven terrain. An attachment member extends freely through a bracket which is joined to the frame of the vehicle. The attachment member also extends freely through a portion of the fender which is adjacent the bracket. Thrust washers having convex and concave engagement surfaces freely encompass the attachment member and are positioned between the fender and the bracket and are attached thereto. Thus, relative movement between the fender and the bracket is permitted to prevent distortion or twisting of the fender as the vehicle travels over rough terrain.

7 Claims, 5 Drawing Figures

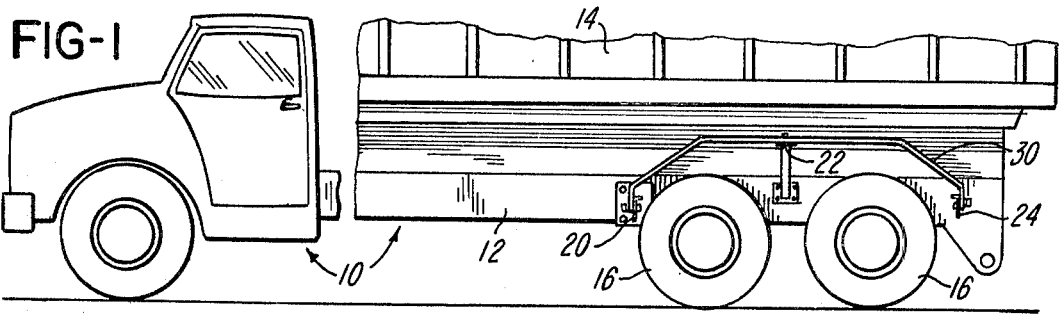
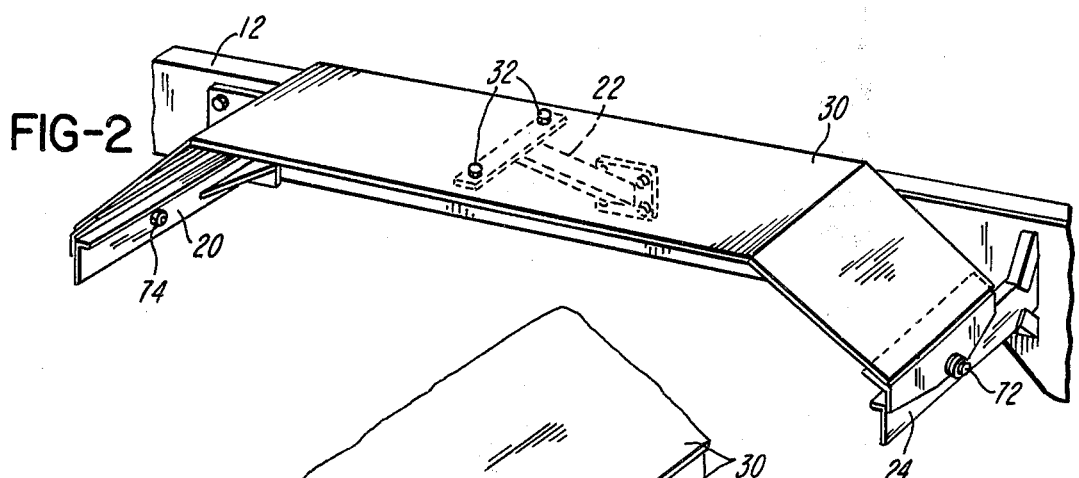
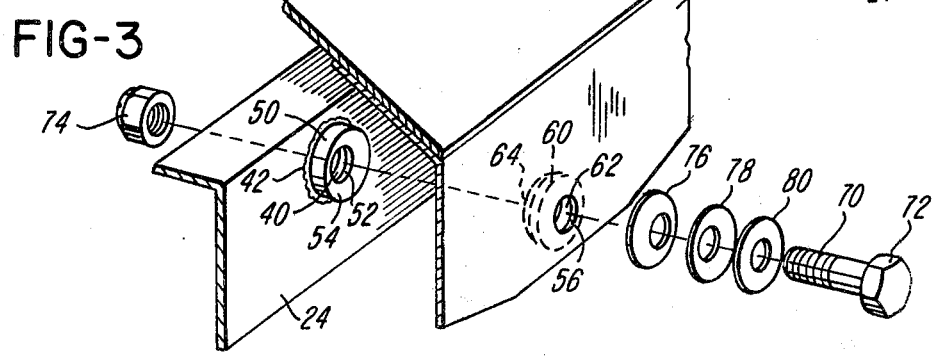
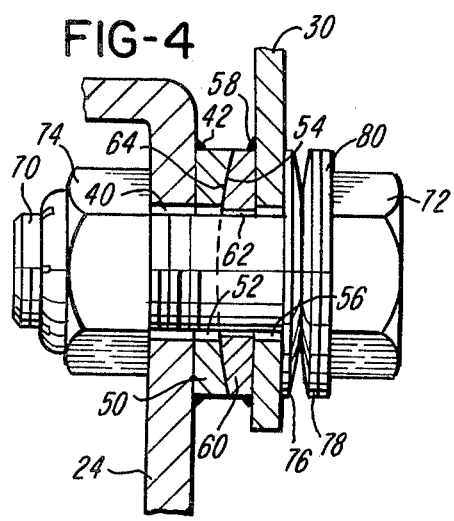
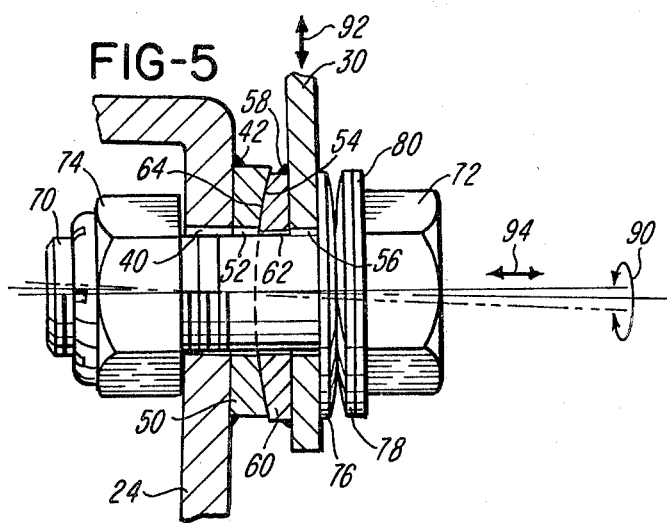

VEHICLE FENDER ATTACHMENT AND SUPPORT STRUCTURE

BACKGROUND OF THE INVENTION

This invention is an improvement over that disclosed in co-pending patent application Ser. No. 069,685, filed Aug. 27, 1979, and now U.S. Pat. No. 4,268,053, which is assigned to the assignee of this application.

A fender which covers the wheel of a vehicle, such as a truck, particularly a dual wheel or dual axle truck, must have considerable length and/or width, as the fender is supported by the frame or chassis of the truck. When the truck travels over rough terrain, the frame or chassis, even though relatively rigid, experiences twisting and/or bending and relative movement between portions thereof. Therefore, under such conditions, if the fender is rigidly attached to the frame or chassis, the fender is subject to twisting and distortion, and damage to the fender and/or damage to the attachment means thereof results.

Known fender attachment devices are disclosed in U.S. Pat. Nos. 2,679,403; 3,506,282; and 3,876,229. However, the devices shown in some of these patents have the objectionable feature that they secure the fender to the frame so rigidly that freedom of movement between the fender and the frame is so limited that damage to the fender occurs. The devices shown in others of these patents permit excess freedom of movement between the frame and the fender and damage to the fender occurs.

It is an object of this invention to provide structure for attachment of a fender to the frame or chassis of a vehicle, such as a truck or the like, by which controlled relative movement between the frame and the fender is permitted. Therefore, the fender and attachment means are protected against damage as the vehicle travels over rough terrain or irregular surfaces or the like and as relative movement in the form of twisting or distortion occurs between portions of the frame.

It is a further object of this invention to provide such attachment structure which permits freedom for relative movement between the frame and the fender while also firmly attaching the fender to the frame.

Other objects and advantages of this invention reside in the construction of parts, the combination thereof, the method of production, and the mode of operation, as will become more apparent from the following description.

BRIEF DESCRIPTION OF THE VIEWS OF THE DRAWING

FIG. 1 is a side view, with parts broken away, showing a truck having a fender over the rear wheels thereof in which the fender is attached to the frame of the truck by the support and attachment structure of this invention.

FIG. 2 is an enlarged perspective view showing the fender of FIG. 1 and the fender support and attachment structure of this invention.

FIG. 3 is an exploded perspective view drawn on a larger scale than FIG. 2, showing a portion of the fender of FIGS. 1 and 2 and the means for attachment of the fender to the frame of the vehicle.

FIG. 4 is a fragmentary sectional view drawn on a larger scale than FIG. 3, showing a portion of the fender of FIGS. 1, 2, and 3, and the means of this invention for attachment of the fender to the frame of the vehicle.

FIG. 5 is a fragmentary sectional view, similar to FIG. 4 and drawn on the same scale as FIG. 4, showing the structure of FIG. 4 and illustrating the type of relative movement possible between the fender and the frame of the vehicle.

DETAILED DESCRIPTION OF THE INVENTION

FIG. 1 shows portions of a truck 10 which has a frame 12 which supports a load carrying member 14. The frame 12 is supported by a pair of axles, not shown, and a plurality of wheels 16. A bracket 20, a bracket 22, and a bracket 24 are attached to the frame 12 adjacent the wheels 16. The brackets 20, 22, and 24 are adapted to support a fender 30 which covers the wheels 16. A midportion of the fender 30 is secured to the bracket 22 by means of bolts 32. The end portions of the fender 30 are attached to the respective brackets 20 and 24 by means now discussed with respect to the bracket 24.

The bracket 24 is provided with an opening 40 therethrough. Secured to the bracket 24 by means of a weld 42, and in alignment with the opening 40, is a thrust washer 50 provided with an opening 52 therethrough. The thrust washer 50 has a flat surface in engagement with the bracket 24 and a concave surface 54 facing away from the bracket 24.

The fender 30 has an opening 56 therethrough in alignment with the opening 40 in the bracket 24 and in alignment with the opening 52 of the thrust washer 50. Secured to the fender 30 by means of a weld 58 is a thrust washer 60 provided with an opening 62 therethrough in alignment with the opening 56 in the fender 30. The thrust washer 60 has a convex surface 64 in engagement with the concave surface of the thrust washer 50. Thus, the thrust washers 50 and 60 are in mutual engagement and positioned between the fender 30 and the bracket 24.

A bolt 70 having a head 72 extends through the opening 56 in the fender 30, through the opening 62 in the thrust washer 60, through the opening 52 in the thrust washer 50, and through the opening 40 in the bracket 24. The bolt 70 also has a nut 74 attached thereto and shown in engagement with the bracket 24. Encompassing the bolt 70 between the head 72 and the fender 30 are concave-convex spring washers 76 and 78, which have the convex portions thereof in engagement. Between the spring washer 78 and the head 72 of the bolt 70 is a flat washer 80. As illustrated in FIGS. 4 and 5, the opening 40 through the bracket 24, the opening 52 through the thrust washer 50, the opening 62 through the thrust washer 60, and the opening 56 through the fender 30 are all significantly greater than the transverse dimension of the bolt 70 which extends therethrough.

OPERATION

When the truck 10 travels over rough or uneven terrain there is a distortion and/or twisting of the frame 12. Therefore, forces are present in the frame 12 and the fender 30 which urge relative movement between the ends of the fender 30 and the frame 12. Due to the fact that the brackets 20 and 24 are secured to the frame 12, the forces present urge relative movement between the brackets 20 and 24 and the ends of the fender 30. As relative movement between the brackets 20 and 24 and the ends of the fender 30 is urged, the structure of this invention permits such relative movement. There is sliding relative movement between the thrust washers 50 and 60, as illustrated in FIG. 5, permitting relative movement between the ends of the fender 30 and the brackets 20 and 24. The relative movement between the thrust washers 50 ad 60 is permitted as the openings 40, 52, 62, and 56 are greater than the transverse dimension of the bolt 70 which extends therethrough. The relative movement between the thrust washers 50 and 60 is against the resilient forces of the spring washers 76 and 78. Relative movement between the thrust washers 50 and 60 permits angular and/or lateral movement between the brackets 20 and 24 and the portions of the fender 30 joined thereto through the respective bolts 70. The relative movement between the ends of the fender 30 and the brackets 20 and 24 can be in any one or more of a multiplicity of directions. As illustrated by arrows 90, 92, and 94 in FIG. 5, there may be angular and/or lateral movement between the fender 30 and the bracket 24.

Thus, as a result of the relative movement permitted between the brackets 20 and 24 and the ends of the fender 30, there is no twisting and distortion of the fender 30 or of the brackets 20 and 24 as the vehicle 10 travels over rough or uneven terrain. Also, there are no shearing forces upon the bolt 70 as the vehicle 10 travels over rough or uneven terrain. After such relative movement between the brackets 20 and 24 occurs, as illustrated in FIG. 5, the spring washers 76 and 78 urge the thrust washers 50 and 60 and the fender 30 to return to the normal positions thereof, as illustrated in FIG. 4.

Although the preferred embodiment of the fender attachment and support structure of this invention has been described, it will be understood that within the purview of this invention various changes may be made in the form, details, proportion and arrangement of parts, the combination thereof, and the mode of operation, which generally stated consist in structure within the scope of the appended claims.

The invention having thus been described, the following is claimed.

1. In a vehicle provided with a frame and a wheel member supporting the frame and having a fender covering at least a portion of the wheel member, the combination comprising:
a bracket attached to the frame and extending therefrom to a position adjacent the fender, the fender having an opening therethrough, the bracket having an opening therethrough in alignment with the opening through the fender, a bolt extending through the opening in the bracket and through the opening in the fender, the openings through the bracket and through the fender being significantly larger than the transverse dimension of the bolt which extends therethrough, the bolt having a head and a nut establishing ends thereof so that the fender and the bracket are between the ends of the bolt, a first thrust washer encompassing the bolt, the first thrust washer being attached to the bracket between the bracket and the fender, a second thrust washer encompassing the bolt, the second thrust washer being attached to the fender between the fender and the bracket, the thrust washers having arcuate surfaces in mutual engagement, each of the thrust washers having an opening therethrough significantly greater than the cross-sectional dimension of the bolt which extends therethrough, and spring washer means encompassing the bolt between the ends thereof and urging the fender toward the bracket, the fender and the bracket thus being relatively movable as the thrust washers relatively move against the forces of the spring washer means.

2. In a vehicle provided with a frame and a wheel member in supporting relationship to the frame and having a fender covering the wheel member, the combination comprising:
bracket means attached to the frame adjacent the fender, attachment means attaching the bracket means to the fender, the attachment means including a plurality of thrust washer members positioned between the fender and the bracket means, the thrust washers having arcuate surfaces in mutual engagement, the attachment means including means freely joining together the bracket means and the fender and the thrust washers for relative movement therebetween, and means urging the bracket means and the fender one toward the other, the fender and the bracket means thus being relatively movable as the vehicle travels over uneven terrain.

3. In the vehicle of claim 2 in which the bracket means and the fender are provided with aligned openings therethrough, and the attachment means includes a bolt extending through the openings, the bolt also extending through openings in the thrust washer members, the openings in the thrust washer members and in the fender and in the bracket means being significantly greater than the transverse dimension of the bolt which extends therethrough to permit relative movement between the thrust washers and the bolt and between the fender and bracket means and the bolt.

4. In a vehicle provided with a frame and a wheel member in supporting relationship to the frame and having a fender covering the wheel member, the combination comprising:
bracket means attached to the frame adjacent the fender, attachment means attaching the bracket means to the fender, the attachment means including a plurality of thrust washer members positioned between the fender and the bracket means, the thrust washers having mutually engageable concave and convex surfaces, means urging the bracket means and the fender one toward the other, the bracket means and the fender being provided with aligned openings therethrough, the attachment means including a bolt which extends through the openings, the thrust washer members having openings through which the bolt extends, the openings in the fender and in the bracket means and in the thrust washers being greater than the transverse dimension of the bolt which extends therethrough, the means urging the thrust washer members into mutual engagement including spring washer members through which the bolt extends, the fender and the bracket means thus being relatively movable as the vehicle travels over uneven terrain.

5. Structure for support of a fender of a vehicle having a frame supported by a wheel covered by the fender, comprising:
a bracket attached to the frame and having a portion adjacent the fender,
an attachment member extending through the bracket and through said portion of the fender,
a first thrust washer, a second thrust washer, the first and second thrust washers being between said portion of the fender and the bracket and encompassing the attachment member, the first thrust washers having a concave engagement surface in engagement with the second thrust washer and the second thrust washer having a convex engagement surface in engagement with the concave engagement surface of the first thrust washer, said portion of the fender and the thrust washers being laterally movable with respect to the attachment member which extends therethrough, resilient means encompassing the attachment member and urging the bracket and said portion of the fender one toward the other, said portion of the fender thus being movable with respect to the bracket to avoid distortion of the fender as the vehicle travels over uneven terrain.

6. Structure for attachment of a fender to a vehicle such as a truck or the like, comprising: a support member adjacent a portion of the fender, an attachment member extending through the support member and through said portion of the fender and being laterally movable with respect thereto, first and second engagement members encompassing the attachment member and laterally movable with respect thereto, the first and second engagement members being positioned between the support member and said portion of the fender, each of the engagement members having an arcuate surface, the arcuate surfaces of the engagement members being in mutual engagement, resilient means encompassing the attachment member and urging said portion of the fender and the support member one toward the other, the support member and said portion of the fender thus being relatively movable.

7. Structure for attachment of a fender to a vehicle such as a truck or the like, comprising: a support member adjacent a portion of the fender, an attachment member extending through the support member and through said portion of the fender and being laterally movable with respect thereto, first and second engagement members encompassing the attachment member and laterally movable with respect thereto, the first and second engagement members being positioned between the support member and said portion of the fender, each of the engagement members having an arcuate surface, the arcuate surfaces of the engagement members being in mutual engagement, the attachment member being a bolt having a head and a nut, with the support member and the engagement members and said portion of the fender being between the nut and the head, a spring member encompassing the bolt and urging movement of said portion of the fender toward the support member, the support member and said portion of the fender thus being relatively movable.

* * * * *